United States Patent [19]

Mizukami et al.

[11] Patent Number: 4,553,530

[45] Date of Patent: Nov. 19, 1985

[54] DEVICE FOR COLLECTING SOLAR HEAT

[75] Inventors: Akihiko Mizukami; Tetsushi Shimaya, both of Shiga, Japan

[73] Assignee: Kyocera Corporation, Kyoto, Japan

[21] Appl. No.: 610,828

[22] Filed: May 15, 1984

[30] Foreign Application Priority Data

May 17, 1983 [JP] Japan .............. 58-74397[U]

[51] Int. Cl.$^4$ .............................. F24J 3/02
[52] U.S. Cl. .................. 126/422; 126/443; 126/447
[58] Field of Search .............. 126/443, 442, 433, 434, 126/450, 422, 419, 438, 446, 447

[56] References Cited

U.S. PATENT DOCUMENTS

| | | | |
|---|---|---|---|
| 1,753,227 | 4/1930 | Wheeler et al. | 126/422 |
| 4,165,733 | 8/1979 | Middleton | 126/420 |
| 4,253,445 | 3/1981 | Wilson | 126/437 |
| 4,273,104 | 6/1981 | Uroshevich | 126/443 |
| 4,308,857 | 1/1982 | Sims | 126/443 |
| 4,387,422 | 6/1983 | Steutermann | 126/422 |
| 4,416,258 | 11/1983 | Gravely | 126/435 |

Primary Examiner—James C. Yeung
Attorney, Agent, or Firm—Spensley Horn Jubas & Lubitz

[57] ABSTRACT

This disclosure relates to a device for collecting solar heat by use of a vacuum tube type heat collector having a heat collecting plate and a heat medium tube disposed in a vacuum glass tube. The device is of the structure in which a temperature sensor is inserted together with a protection tube into the vacuum glass tube in a manner of the sensor being freely insertable thereinto and drawable therefrom outside the tube to facilitate replacement of the sensor, so that not only the temperature itself in the glass tube but also the relation between the interior of the heat collector and the temperature of medium in a heat accumulating tank can be detected as correctly as possible so as to realize operation of a device efficient for heat collection.

8 Claims, 6 Drawing Figures

DEVICE FOR COLLECTING SOLAR HEAT

BACKGROUND OF THE INVENTION

1. Field of the Invention

This invention relates to a device for collecting solar heat by the use of a vacuum tube type heat collector having heat collecting plates and heat medium tubes.

2. Prior Art

This type of device is designed to accumulate a high-temperature heat medium in a heat accumulating tank by repeated operation of transferring a heat medium heated to high temperatures by a vacuum tube type heat collector to a heat accumulating tank and of feeding a low-temperature heat medium in the heat accumulating tank to a heat collector. Generally, the heat medium is circulated by a circulation pump between the heat collector and the heat accumulating tank, and the pump is driven when the temperature of the heat medium heated at the outlet portion of the heat collector is raised higher than a specified temperature or when the temperature on the side of the heat collector is higher by comparison between the heat medium temperature at the bottom of the tank and that at the outlet portion of the heat collector.

The vacuum tube type heat collector provides the advantage that the collector permits the free installation thereof in various ways such as horizontal installation, but it has the counterbalancing disadvantage that the point of space wherein the temperature is highest inside the heat collector is difficult of easy measurement as opposed to a plate type heat collector.

Under examples of heat controlling devices for a conventional vacuum tube type heat collector are included a device for controlling heat collection by an insolation sensor, a device for controlling heat collection by the temperature of a header portion (confluence of pipes through which a heat medium passes), and the like.

FIG. 1 shows a conventional type device for controlling the collection of heat by an insolation sensor. A low-temperature sensor 2 is disposed in the heat accumulating tank 1, and the insolation sensor 4 is installed in matching relation with respect to a degree of inclination of a heat collecting plate 3. The insolation is sensed by the sensor 4 and is compared by a heat collection controlling unit 5 with the low-temperature sensor 2 on the bottom side of the heat accumulating tank 1, and when it is approximately judged by the controlling unit 5 that collection of heat is possible, a pump 6 operates to collect heat.

A device for controlling the collection of heat by the temperature of the header portion is of the construction in which the header is provided with a sensor so as to sense the temperature of the header and that of the heat medium inside the header and in which when the temperatures of the header and the heat medium in the header become higher than the temperature of the heat accumulating tank to a certain set value, the heat collection pump operates and when the temperatures become lower than the set value, the pump ceases to operate.

FIG. 2 shows a flow chart representing the control of the above-mentioned device using an insolation sensor. In the figure, the reference character TL designates a temperature in the heat accumulating tank 1 detected by the low-temperature sensor 2, and I designates an insolation detected by an insolation sensor 4. FIG. 3 shows a relation between the insolation I and the temperature TL in the heat accumulating tank 1. Both of the aforementioned devices relate to a method of sensing the rough temperature in the insolation sensor and the header portion respectively, and, when the insolation sensor is used, the relation between the insolation and the temperature describes a secondary curve as shown in FIG. 3, and the characters I and TL are not brought into a relation of linear proportion. When the temperature of the header portion is sensed, transfer of heat from the heat collecting unit is delayed, thus the devices being reduced in performance, and positive control becomes impossible. When the insolation is reduced, or when the weather conditions change, or when the temperature of the open air is reduced, the devices are subject to external conditions to render it impossible to make accurate control.

SUMMARY OF THE INVENTION

Accordingly, the object of the invention is to provide a device for collecting solar heat which senses a correct temperature inside a vacuum tube and positively controls temperatures. Other objects and advantages will become more apparent from a description of an embodiment of the invention taken in conjunction with the accompanying drawings.

BRIEF DESCRIPTION OF THE DRAWINGS

FIG. 4 is a plan view of the device shown partially in cross section;

FIG. 5 is a sectional view taken along the line V—V of FIG. 4; and

FIG. 6 is a sectional view taken along the line VI—VI of FIG. 5.

DETAILED DESCRIPTION OF THE PREFERRED EMBODIMENT

Figure 1:
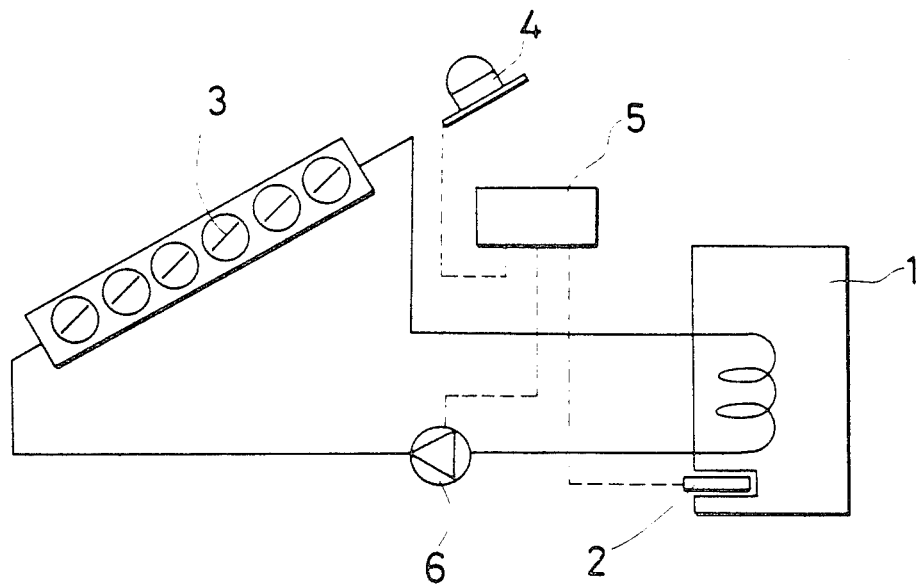
FIG. 1 shows a heat collection control device wherein an insolation sensor is used.
Figure 2:
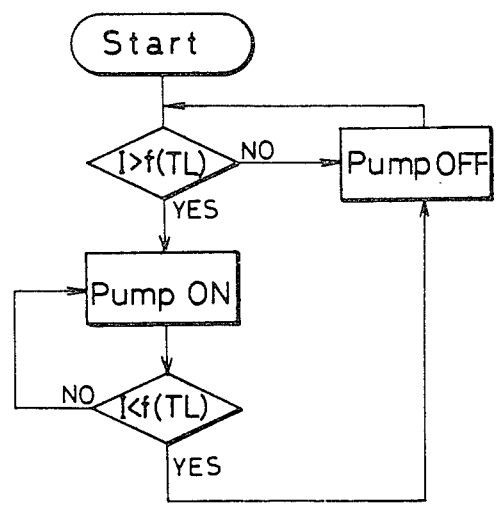
FIG. 2 is a flow chart showing a manner of control.
Figure 3:
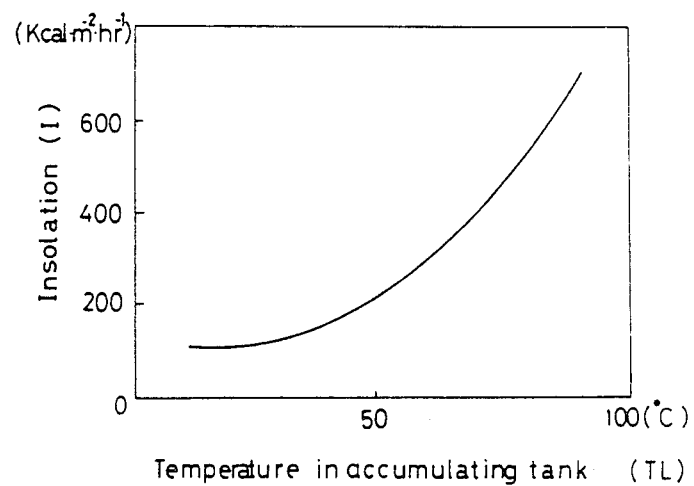
FIG. 3 is a graph showing the relation between an insolation and the temperatures in a heat accumulating tank.
Figure 4:
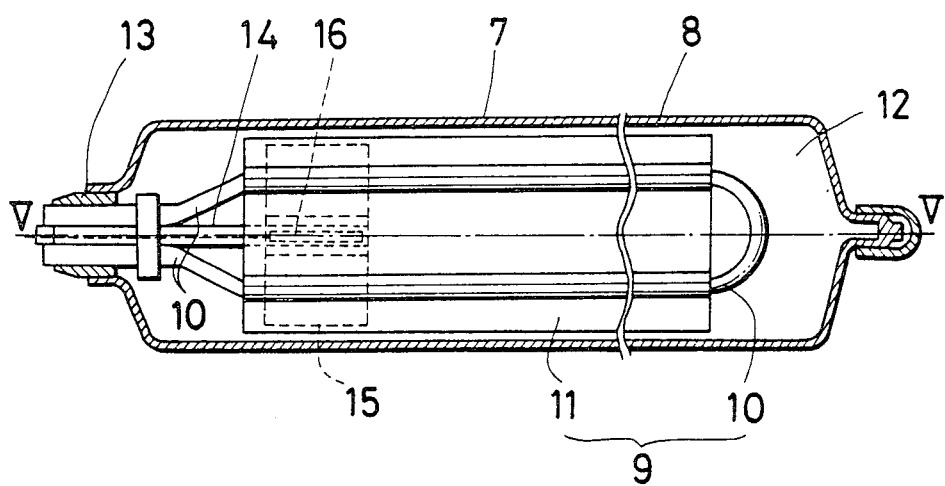
FIGS. 4 to 6 show a solar heat collecting device according to the invention.
Figure 5:
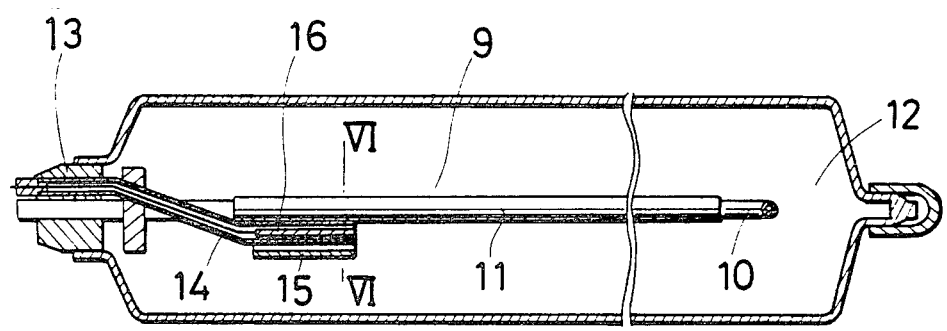
Figure 6:
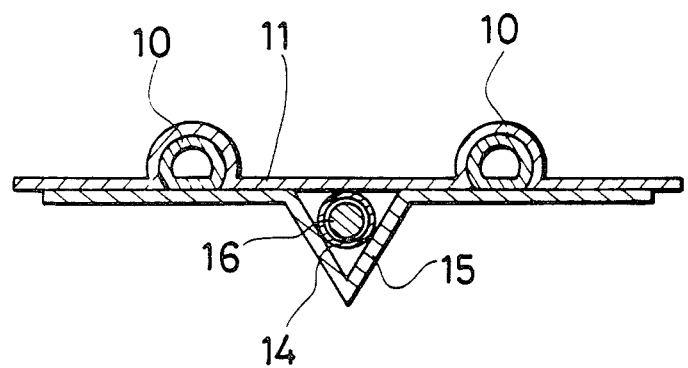

In the drawing, the numeral 7 designates a solar heat collector; 8 a light-transmitting vacuum glass tube; and 9 designates a heat collecting unit arranged horizontally in approximately the middle of the glass tube 8. The unit 9 comprises a heat medium tube 10 and a heat collecting plate 11, the tube 10 being made of copper and U-shaped and adapted to allow flow of a heat medium therethrough, and the plate 11 being made as of aluminum formed integral with the heat medium tube 10. The numeral 12 designates a vacuum layer inside the glass tube 8; 13 designates a sealing fitting for joining the heat medium tube 10 to the glass tube 8, and the fitting is made as of a special stainless steel alloy, and firmly seals the tube 8 and the tube 10. The numeral 14 designates a protection tube for fitting a metal sensor thereto, the tube being made of good heat conductive metal such as copper, and the protection tube 14 is sealingly fixed to the heat medium tube 10 on the side of the sealing fitting 13 by soldering or welding, and the end side, as shown in FIG. 6, is fixed to the heat collecting plate 11 inside the glass tube 8 by a plate 15 and a sensor 16 attached drawably to the inside of the protection tube 14 senses the temperatures in the vicinity of the heat collecting unit 9. The inital end side of the protection tube 14, as shown in FIGS. 4 and 5, extends outwardly through the sealing fittings 13 so as to permit replacement of the sensor 16 from outside.

In the solar heat collector 7 of the construction above, the sensor 16 inside the protection tube 14 fixed to the inside of the glass tube 8 precisely senses the temperature in the glass tube 14 to operate the aforestated solar heat collection control device.

Since the device of the invention is constructed as above, the device makes it possible to make positive detection of temperatures inside the vacuum tube 8 irrespective of the state of installation of the vacuum glass tube 8, so that the device is enabled to make positive control of the heat collecting device to bring the performance of the vacuum tube type heat collector into full swing. Further, the mounting structure of the sensor 16 guarantees the reliability of vacuum degree in that the protection tube 14 containing the sensor 16 therein is led into the vacuum tube 8 from the sealing fitting 13 of the sealingly fixed portion of the glass tube 8 and the protection tube 14 is sealed on the side of the sealing fitting 13 to the heat medium tube 10 and sealing fitting 13 by soldering or welding metal to metal. Further, in the device of the invention, the sensor 16 is attached to the inside of the tube 14 so as to permit free insertion of the sensor 16 into the tube 14 and drawing thereof from outside of the tube, so that easy access to replacement of the sensor 16 alone is possible without involving replacement of the sensor 16 together with the vacuum tube 8. Accordingly, the invention makes it possible to reduce the cost of the heat collector.

Also, since the invention renders it possible to directly detect the temperature inside the vacuum tube 8, mutual control of temperature between the heat accumulating tank and the heat collector 7 is possible in such manner that even if the heat collector 7 is suddenly cooled by radiation, the device can quickly detect such sudden cooling and make antifreezing control of the heat collector 7 by discharging the heat medium in the heat collector 7 out of the collector 7. In this manner, the collector 7 is protected against damage. Furthermore, since the sensor 16 is disposed inside the protection tube 14, there is another advantage in that there is no possibility of the sensor 16 becoming corroded due to the contact of the sensor 16 with the heat medium nor possibility of the sensor 16 impeding the flow of heat medium.

Having described our invention as related to the embodiment shown in the accompanying drawings, it is our intention that the invention be not limited by any of the details of description, unless otherwise specified, but rather be construed broadly within its spirit and scope as set out in the accompanying claims.

What is claimed is:

1. A solar heat collecting device having a light-transmitting vacuum tube, a heat medium tube for passing a heat medium therethrough disposed in said vacuum tube, a protection tube inserted fixedly into said vacuum tube and a temperature sensor disposed in said protection tube so as to permit free insertion of the sensor into and drawing thereof out of said tube from outside and solar heat collecting device.

2. A device according to claim 1 further comprising a heat collecting plate coupled to said heat medium tube inside said vacuum tube, and a sealing fitting coupled to said vacuum tube wherein said protection tube extends through said fitting into the vacuum tube, and said protection tube is on the end side fixedly held by said heat collecting plate and soldered or welded on said sealing fitting side of the protection tube to said heat medium tube.

3. A device according to claim 2 wherein said protection tube extends out one end of said vacuum tube so as to permit insertion and withdrawal of the sensor with respect to the tube from outside said vacuum tube.

4. A solar heat collecting device comprising:
a hollow enclosure which is transparent to light;
a heat collector disposed within said hollow enclosure;
a conduit coupled to said heat collector and in thermal contact therewith for allowing flow of an externally supplied heat medium therethrough; and
a temperature sensor thermally coupled with said heat collector;
wherein said hollow enclosure is hermetically sealed and is evacuated throughout all or a portion of the interior thereof and further comprising a hollow tube extending into said enclosure coupled to said heat collector and wherein said temperature sensor is positioned within said hollow tube such that said temperature sensor may be inserted into and withdrawn from said enclosure without destroying the vacuum within said enclosure.

5. A solar heat collector comprising:
an evacuated tube composed of material transparent to light;
heat collecting means disposed within said tube for absorbing thermal energy from incident solar energy; and
temperature sensing means thermally coupled to said heat collecting means for measuring the temperature of said heat collecting means;
wherein said temperature sensing means includes a protection tube thermally coupled to said heat collecting means and extending through the exterior of said evacuated tube and a temperature sensor removably positioned within said protection tube and thermally coupled therewith.

6. A solar heat collector as set out in claim 5 further including sealing means for maintaining a hermetic seal between said protection tube and said evacuated tube.

7. A solar heat collector as set out in claim 6 wherein said sealing means comprises an annular metal plug hermetically sealed to said evacuated tube, said heat collecting means and said protection tube.

8. A solar heat collector as set out in claim 5 wherein said heat collecting means comprises a metal plate and said protection tube is coupled to said plate by a second metal plate having a V-shaped cross-sectional segment for receiving said protection tube.

* * * * *